May 12, 1942.  W. D. LE BAR ET AL  2,283,008
CHEMICAL PROCESSING APPARATUS
Filed Aug. 1, 1940  3 Sheets-Sheet 1
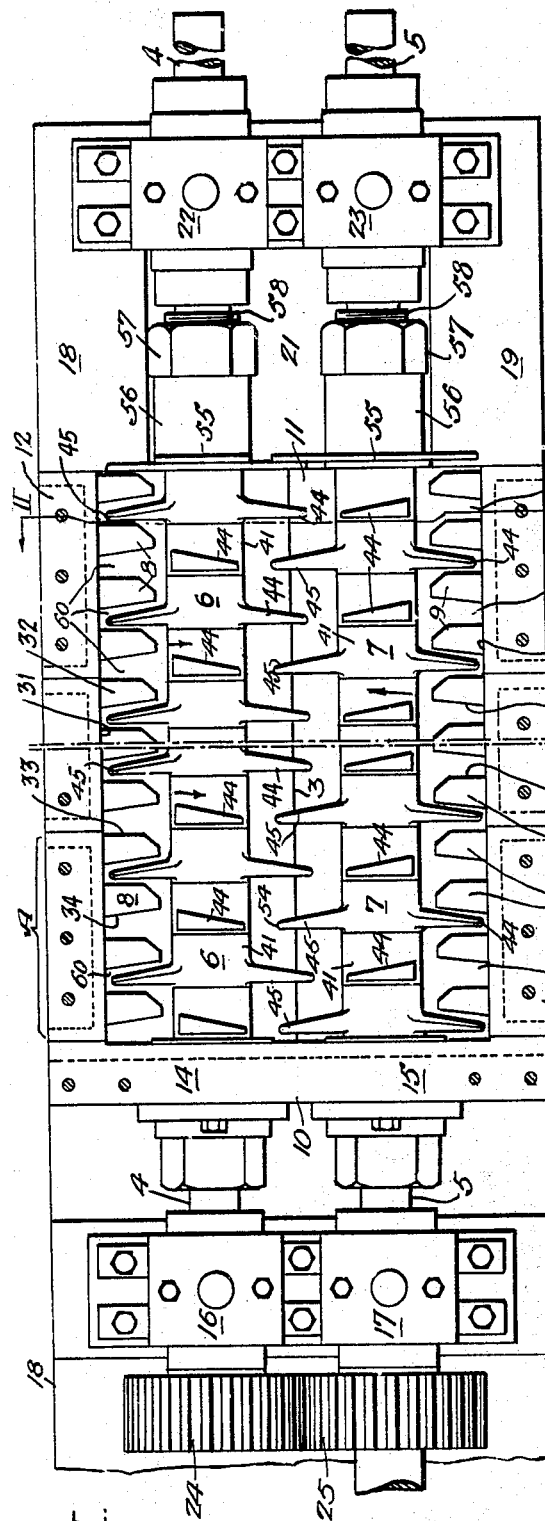
Fig. I.
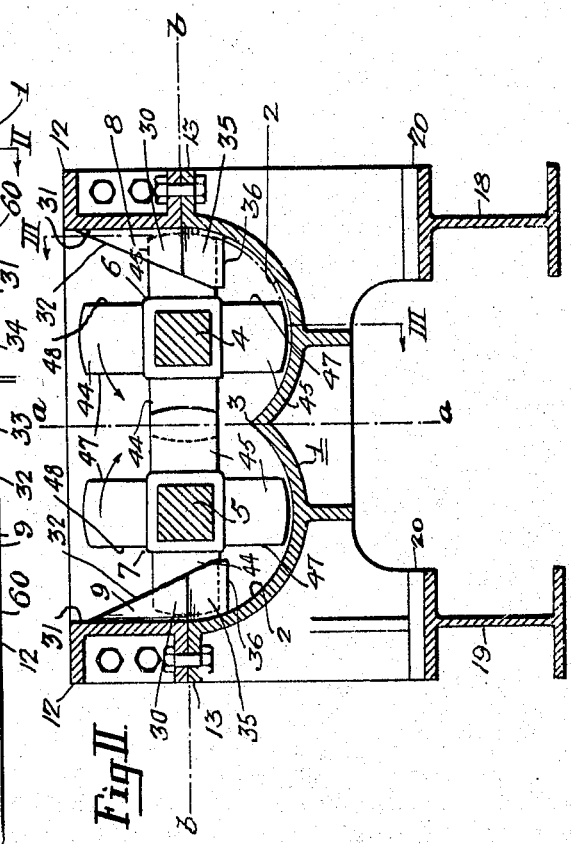
Fig. II.
Inventors
William D. Le Bar
Russell E. Cushing
by their Attorneys
Howson & Howson May 12, 1942.  W. D. LE BAR ET AL  2,283,008
CHEMICAL PROCESSING APPARATUS
Filed Aug. 1, 1940     3 Sheets-Sheet 2
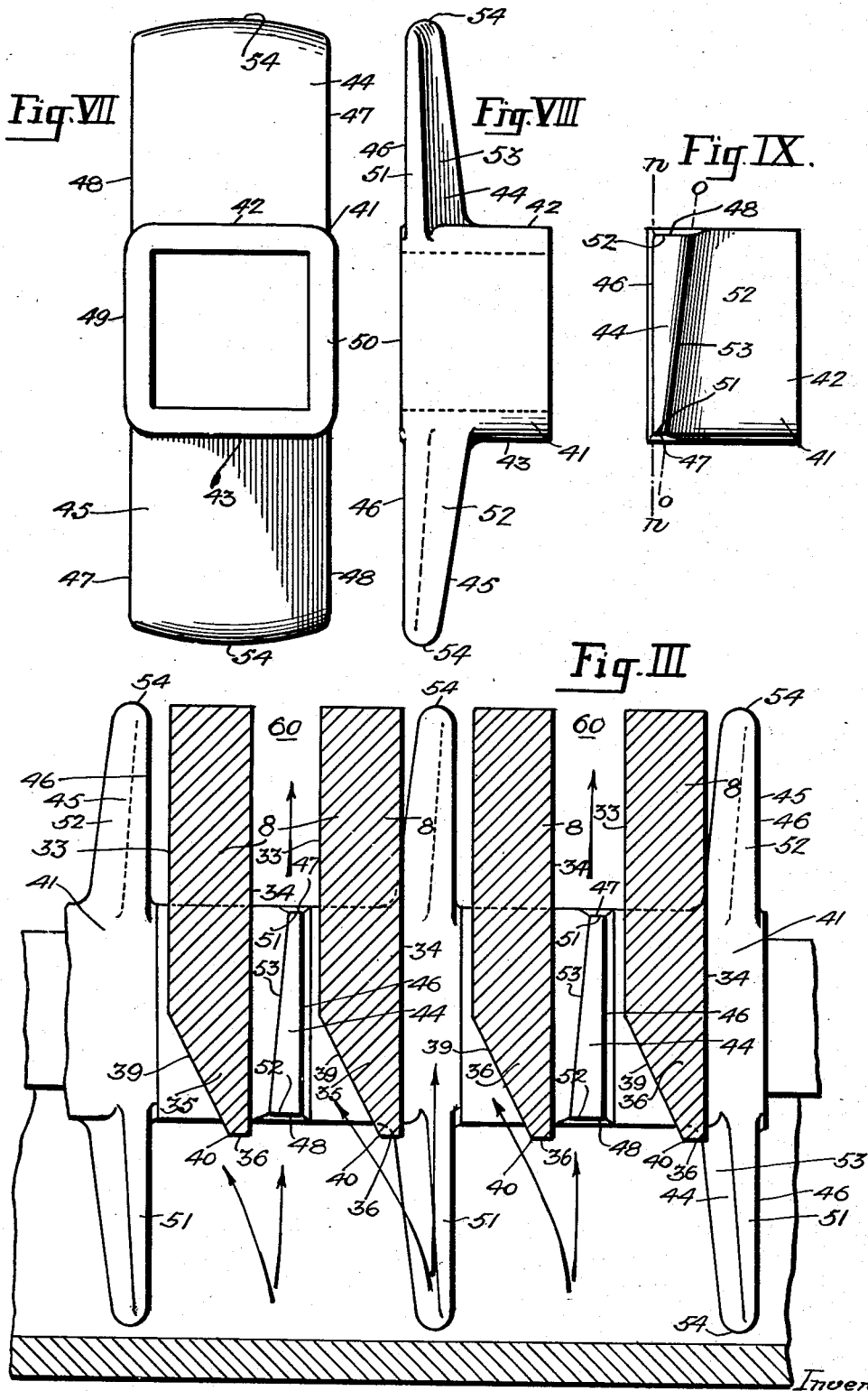
Inventors
William D. LeBar
Russell E. Cushing
by their Attorneys
Howson & Howson May 12, 1942.　　W. D. LE BAR ET AL　　2,283,008
CHEMICAL PROCESSING APPARATUS
Filed Aug. 1, 1940　　3 Sheets-Sheet 3
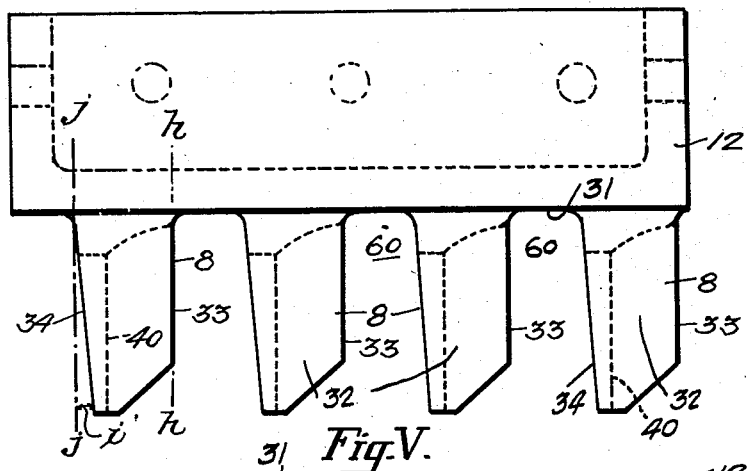
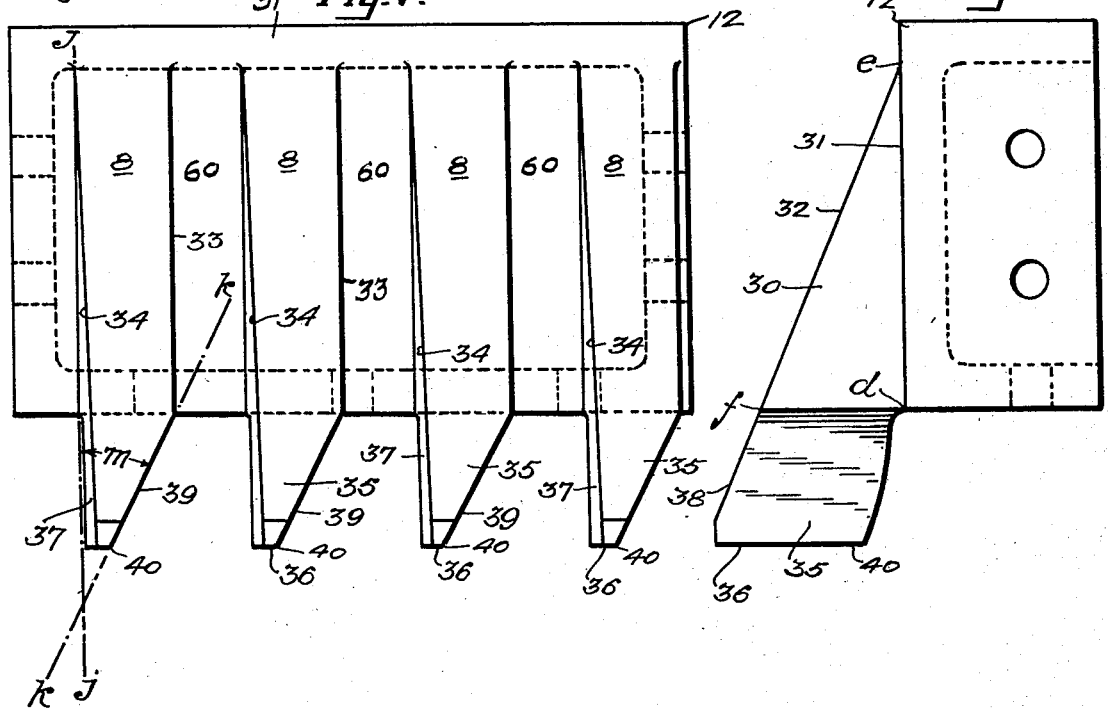
Inventors
William D. Le Bar
Russell E. Cushing
by their Attorneys
Howson & Howson Patented May 12, 1942

2,283,008

UNITED STATES PATENT OFFICE 2,283,008

CHEMICAL PROCESSING APPARATUS

William D. Le Bar and Russell E. Cushing, Wyandotte, Mich., assignors to The Pennsylvania Salt Manufacturing Company, Philadelphia, Pa., a corporation of Pennsylvania Application August 1, 1940, Serial No. 349,366

16 Claims. (Cl. 259—104)

This invention relates to an apparatus for mixing, working, and simultaneously advancing the components of chemical compounds or compositions as a continuous process, in which the ingredients are initially assembled at one end of the device and the resultant product is discharged from the opposite end thereof.

The device of the present invention is particularly adapted for the production of chemical compounds or compositions, during the production of which the ingredients pass through a more or less plastic state. The device may be used where the ingredients are merely mixed physically or a chemical reaction may take place in the device. The device is particularly applicable for use in conjunction with the latter. The invention will be described, for illustrative purposes, in connection with the preparation of alkali sub-silicate or aluminate products, specifically the sodium compounds, by reacting powdered or molten caustic alkali and a material in powdered form furnishing the appropriate acidic oxide.

The production of various sodium sub-silicate products by reacting powdered caustic soda with finely divided silica and with finely divided water glass is disclosed in U. S. Patent No. 2,083,545 dated June 15, 1937, and a copending application, Serial No. 101,322, filed September 17, 1936, respectively. The use of molten caustic soda with silica or water glass in the production of sodium sub-silicates is described in U. S. Patent No. 2,100,944 dated November 30, 1937. Regarding sodium aluminate products, U. S. Patents Nos. 2,018,607 dated October 22, 1935, and No. 2,159,843 dated May 23, 1939, describe the production thereof from alumina hydrate using powdered caustic soda and molten caustic soda respectively.

As stated in the above noted patents and pending application the reaction mass passes through a more or less plastic state before being converted into a solid product, and the object of the present invention is to provide an apparatus for initially combining, working, and simultaneously advancing the caustic soda and a compound for furnishing the desired acidic oxide, under conditions to cause a reaction to form the plastic mass, and for discharging the plastic mass, all as part of one continuous process, as distinguished from "batch" mixings wherein the materials in predetermined proportions are placed in a receptacle, worked, and the plastic mass discharged, intermittently in recurrent cycles, whereby the product is continuously discharged from the device at the proper moment to avoid solidification within the device.

The construction and operation of the device forming the subject matter of the present invention will be fully disclosed hereinafter, reference being had to the accompanying drawings, of which:

Fig. I is a longitudinally contracted plan view;

Fig. II is a transverse sectional elevation taken on the line II—II, Fig. I;

Fig. III is a longitudinal sectional elevation taken on the line III—III, Fig. II;

Fig. IV is an enlarged plan view of a group or gang of stationary ploughs employed in the device;

Fig. V is a front elevation of the structure shown in Fig. IV;

Fig. VI is an end elevation of the structure shown in Figs. IV and V;

Fig. VII is a face view of one of the rotary paddles employed in the device;

Fig. VIII is a side edge view of the paddle shown in Fig. VII; and

Fig. IX is a top edge view of the paddle shown in Figs. VII and VIII.

In the embodiment of the invention disclosed in Figs. I, II and III, the device comprises a twin-barrelled trough 1 formed by two parallel-longitudinal channels 2, 2 of substantially semicircular cross-section intersecting or overlapping each other along the central longitudinal vertical plane $a$—$a$ of the trough 1, by which a central longitudinal ridge 3 is formed in the bottom of the trough.

Concentric with the semi-circular walls of the channels 2, 2, and extending throughout the full length and beyond the opposite ends of the trough 1, is a pair of shafts 4 and 5 respectively. In the present instance, these shafts are shown as being square in cross-section although any suitable polygonous shape, round, or splined shaft may be employed.

Mounted on the shafts 4 and 5 respectively, for rotation therewith in opposite directions, over the top toward the central plane $a$—$a$ are two series of paddles 6 and 7.

The two series of rotary paddles 6 and 7 are adapted to cooperate with two series of stationary ploughs 8 and 9 respectively to mix, work and simultaneously advance the components along the trough 1, from one end adjacent the head 10 of the trough 1 toward the opposite open discharge end 11 thereof.

The ploughs 8 and 9 are preferably cast in groups, four to a group, as shown in Figs. IV and V, integral with a base casting 12 which, in addition to supporting its particular group of ploughs, serves as a vertical extension for the side walls of the trough 1, which, as shown in Fig. 2 normally terminate in horizontal flanges 13, 13 in a horizontal plane $b$—$b$ in which the axes of the shafts 4 and 5 are disposed.

The shafts 4 and 5 are journaled at one end in bearings 14 and 15 in the head 10 of the trough 1 and in bearings 16 and 17 spaced from said head and rigidly supported by longitudinal beams 18 and 19 to which feet 20 on the trough 1 are also rigidly secured.

The opposite ends of the shafts 4 and 5 are journaled in bearings 22 and 23 which are secured to the beams 18 and 19 in longitudinally spaced relation to the open end 11 of the trough 1 to provide a discharge area 21 to receive the product and from which the product may be carried by any suitable chute or conveyer means.

The shafts 4 and 5 are coupled to rotate in opposite directions, as above noted, by gears 24 and 25 and either of the two shafts may be further extended and suitably equipped to receive power from any suitable source, by which the shafts 4 and 5 may be rotated in unison.

In looking along the trough 1 from the closed or forward end 10 thereof, it will be observed that the shaft 4 rotates in a clockwise direction and the shaft 5 rotates in a counter-clockwise direction. Consequently, in order to advance the materials from the closed feed end 10 to the open discharge or rear end 11 of the trough 1, the ploughs 8 and paddles 6 associated with the shaft 4 are "right hand" while the ploughs 9 and paddles 7 associated with the shaft 5 are "left hand."

In each of either of the "right" or "left" hand ploughs 8 or 9 as the case may be, is formed a triangular body portion 30 (Fig. VI) formed integral with the base casting 12, with one side $d$—$e$ of the triangle coincident with the inner vertical wall 31 of the casting 12 which constitutes a vertical extension of the side wall of the trough 1. The base $d$—$f$ of the triangular body lies at right angles to the wall 31 and coincident with the common plane $b$—$b$ (Fig. II) of the axes of the shafts 4 and 5. The third side or edge $e$—$f$ constituting the inner wall 32 of the triangular body 30 extends at an acute angle to the wall 31. The rear face 33 of the triangular body portion 30 lies in a vertical plane $h$—$h$ at right angles to the side wall 31 of the trough 1, transversely of the axes of the shafts 4 and 5. The front face 34 of the triangular body 30 lies in a plane at an acute angle $i$ to a transverse plane $j$—$j$ which parallels the plane $h$—$h$ of the rear face.

Below the base plane $d$—$f$ of the triangular body 30, each of the ploughs 8 and 9 is provided with a depending chisel or beveled portion 35, the bottom surface 36 of which is rather blunt and disposed in a horizontal plane parallel to the base plane $f$—$d$ of the triangular body portion 30. The front face 37 of the chisel 35 is coplanar with the front face 34 of the triangular body portion 30. The inner surface 38 of the chisel 35 is coplanar with the inner surface 32 of the body portion 30 of the plough. The rear face 39 of the chisel 35 is disposed in a plane $k$—$k$ at an acute angle $m$ to the plane $j$—$j$ from which the face 34—37 of the plough recedes at the angle $i$. The rear edge 40 of the bottom 36 of the chisel 35 is parallel to the planes $h$—$h$ and $j$—$j$ (Fig. IV).

The paddles 6 and 7 are each constructed in accordance with the illustrations of Figs. VII, VIII and IX. Each paddle comprises a hub 41, which, in the present instance, is rectangular, to fit the square shaft 4 or 5, as the case may be.

Extending radially from each of two opposite flat sides 42 and 43 of the hub 41, are blades or paddles 44 and 45 respectively. Each blade has a peculiar wedge shape cross-section, as shown in Fig. IX, with a flat forward surface 46 disposed in a plane $n$—$n$ at right angles to the axis of the shaft on which the paddle is mounted.

The opposite edges 47 and 48 of each blade are parallel and the width of the blade therebetween is substantially equal to the width of the hub 41 between the second pair of opposite flat sides 49 and 50 thereof.

The leading edge 47 of each blade presents a relatively narrow flat surface 51 to the material with which it makes contact, as hereinafter described. The trailing edge 48 of each blade has a relatively wider flat surface 52. The rear face 53 of each paddle extends in a plane $O$—$O$ at an acute angle to the common plane $n$—$n$ of the front faces 46, 46 of the paddle blades.

The end surfaces 54, 54 of the paddle blades 44 and 45 respectively, are curved from the leading edges 47 to the trailing edges 48 of the paddle blades and are of semi-circular cross sections of progressively increasing radius from the leading edges 47 to the trailing edges 48 of the blades.

At the open discharge end 11 of the trough 1, each shaft 4 and 5 is provided with four radial blades 55, 55 set at 90° apart, in the present illustration, although fewer or more blades set at different angles from those shown may be employed.

As an example, to illustrate how the peculiarly shaped ploughs and paddles of the present case act and cooperate to perform the functions necessary to carry out the mixing step in the continuous process heretofore referred to, and to advance the material step by step along the trough, from the forward end 10 thereof to the discharge end 11 thereof, caustic soda and other reactant are continuously fed in proper proportions into the forward end 10 of the trough 1. For example, the caustic soda and other reactant are fed in proper proportion to form a product having a ratio of $Na_2O$ to acidic oxide desired in the product. The two components, when in powdered form, may be fed from suitable hoppers to automatic weighing conveyers or the like in such a manner that the rate of feed is maintained at a constant value.

When using powdered caustic soda it is desirable to house the feeding mechanism to eliminate contact of moisture therewith.

When molten caustic soda is employed, it may be fed to the trough 1 by a positive displacement pump or a bucket elevator operating at constant speed.

The components entering the head end 10 of the trough 1 are intimately mixed by the paddles and ploughs in the mixing zone A of the trough 1, adjacent the head 10. The paddles 6 and 7, due to their wedge shape cross-section operating in the bulk formed of the two ingredients in the lower portion of the trough 1 in the zone A, which mass preferably is maintained at a level no higher than the plane $b$—$b$, stirs and mixes the two together by tossing the substances aside as the narrower leading edges of the blades penetrate and the wider trailing edges follow through the mass. The blades also on the two shafts 4 and 5 carry portions of the mass upwardly between adjacent ploughs of the series 8 and 9 respectively, and over the tops of the shafts and square hubs 41 and dump these portions together between said shafts onto the central ridge 3 in the bottom of the trough 1 which directs the dumpings in opposite directions into the paths of the blades 6 and 7 in the semicircular channels 2, 2 respectively of the trough 1.

As the ingredients become thoroughly mixed in the zone A a reaction takes place which starts the transition of the mass from a powdered state, or from a mixed powder and liquid state, as the case may be, depending upon the type of caustic soda used (powdered or molten) into a plastic state. As the plastic state becomes more pronounced, the unique cooperation between the blades 6 and 7 and the ploughs 8 and 9 becomes more effective. In this regard, the leading edges 47 of the paddles rising through the mass in the trough 1, below the plane b—b, carries portions of the mass upwardly between the straight transverse rear edges 33 and the transversely angular forward faces 34 of adjacent ploughs 8, 8 and 9, 9 at opposite sides respectively of the trough 1.

Each blade will push in front of its leading edge 47 a portion of the mass greater in width than the width of the channel 60 formed between the adjacent rear and front faces of successive ploughs. As a result thereof a goodly portion of the excess material carried up by each blade is forced into contact with the longitudinally inclined face 39 of the rearmost plough and is advanced thereby longitudinally of the trough 1 (toward the rear open end 11 thereof) into the path of the blades of the next succeeding paddle on the shaft. The blades of succeeding paddles are set at 90° apart.

The blades of the next succeeding paddle, in turn, after being relieved of excess material in the manner noted above, rise under the excess mass which has been advanced into their path by the chisel end 35 of the preceding plough and carry the sliced off portions upwardly into the channel 60 between the two ploughs, to a position above the plane b—b.

The material moving up through the channel 60 is then carried by the blades over the top of the shaft on which the paddles are mounted into the center of the trough between the two shafts 4 and 5, and down into the channels 2, 2 of the trough 1, then under the shafts 4 and 5 to be mixed with the masses in the channels 2, 2 for a repeat of the cycle.

The recurrent cycles, each including the advancement of a portion of the mass longitudinally of the trough by reason of the longitudinal angularity of the back face of the chisel end of each plough and the circular motion over the top, then under the bottom of the shaft, eventually advance these portions of the mass step by step along the trough 1 toward and out of the open end 11 thereof into the circular paths of the cutter blades 55.

In instances where chemical reactions take place in the materials being mixed, the time delay between the periodic advancements of the materials longitudinally of the trough, as afforded by the materials being carried in a circular path over the tops of the shafts 4 and 5, or transversely of the receptacle in which the materials are being mixed, after leaving one end of each channel 60 and before again engaging one of the longitudinally inclined surfaces at the opposite end or entrance to the channels 60, is highly beneficial in that it permits such reactions to take place at times when the materials are not being advanced longitudinally of the receptacle. In other words, the longitudinal movement of the material is periodically interrupted by the transverse movement long enough and often enough during the progress of the material through the mixer to afford reaction in and of the materials to any desired extent before the mixture is ejected from the receptacle.

The length of the trough and the number of recurrences of the advancing cycles are such that the mass is discharged from the end 11 of the trough while still in a plastic state, i. e. before the mass reaches the stage of solidification or in some instances, depending upon the materials employed and the results desired, a solid may be discharged from the device.

The period of retention of the material in the device may be governed to suit conditions and for different materials by adding to or removing from the shafts and side walls predetermined numbers of the paddles 6 and 7 and ploughs 8 and 9, substituting therefor sleeves 56 of the character shown in Fig. I, between the cut-off blades 55 and the retaining nuts 57 threaded onto reduced threaded portions 58 of the shafts 4 and 5 respectively.

During the rising of each blade between the rear straight face 33 of one plough and the front angular face 34 of the next adjacent plough, the rear angular face 53 of the blade produces a trowelling action in the material against the angular front face of the plough. Thus, a kneading effect is produced between these two surfaces which tends to give a more efficient intermixing and working together of the ingredients.

The material is of such consistency that the blades provide no advancement thereof once the plastic stage sets in and as a result thereof the material would merely cling to the blades and travel in a circular path therewith if it were not for the coaction of the ploughs in chiseling off a portion of the surplus around each blade. The inclination of the rear faces of the ploughs toward the rear or discharge end of the trough causes the sliced-off surplus to move in that direction, thus the material is advanced along the trough 1 to and out the discharge end 11 thereof.

Upon referring to Fig. II, it will be clear that, as the blades 44 and 45 revolve and carry a mass of material upwardly into contact with the bottom edges 36 of the ploughs 8 and 9, the leading edges 47 of the blades, coacting with the bottom edges 36 of the ploughs, effect a scissors action on the material therebetween and shear off excess material from each blade as the blade enters the lower end of its channel 60. The sheared-off material engages the longitudinally inclined surfaces 39 of the ploughs and is advanced thereby from the path of rotation of the blades of each paddle into the path of rotation of the blades of the next succeeding paddle. Obviously, the relative angles of the leading edges 47 of the blades 44, 45 and the bottom edges 36 of the ploughs 8 and 9 can vary over a wide range without disturbing the scissors action between the two. It will also be clear that the bottom edges 36 of the ploughs may be above, below, or substantially in the plane b—b without altering the scissors effect.

It will also be understood that, instead of the blades on the shaft 5 being arranged at 90° with respect to the blades on the shaft 4, and instead of the corresponding blades on the two shafts being in the same transverse planes and having an intermeshing relation, as shown in Figs. I and II, the blades on the shaft 5 may be offset longitudinally of the shaft with respect to the blades on the shaft 4, to operate in different transverse planes respectively, and the blades on the shaft 5, under these circumstances, may be set at any desired angle with respect to the blades on the shaft 4, without departing from the spirit of the invention. Under these circumstances, the shafts 4 and 5 may be rotated at relatively different speeds, if desired. It will be understood that the ploughs with which the offset blades on the shaft 5 cooperate, would be offset longitudinally of the trough I in the same manner and to the same extent as the blades.

It will also be understood that while two shafts and two sets of ploughs have been shown and described in the present case, the number of shafts may be decreased to one or increased to three or more, and two or more series of ploughs may be employed with each shaft or with a single shaft instead of a single series of ploughs for each shaft, without departing from the spirit of the invention.

It will also be understood that, when desired, the trough I may be provided with a suitable cover extending over the full length thereof or to any desired distance along the trough from the forward or feed end thereof.

It will be understood that while the ploughs 8 and 9, which form the channels 60, 60 therebetween, have been shown and described as being stationary and while the receptacle I has been shown and described as being in the form of a trough, the ploughs may be fixed to a shaft within the receptacle to rotate relative to the paddles in the same direction at the same speed or in an opposite direction at a different speed as the paddle shaft or shafts, or vice versa, or the receptacle may be of the closed type and may be rotated about its longitudinal axis, if desired. Such variations obviously fall within the scope of the present invention which resides primarily in effecting rotation between the paddles and the channel forming means provided with a longitudinally inclined surface at one side of each channel, whereby portions of the material being moved transversely of the receptacle by the paddles etc. on the shaft will engage the inclined surfaces of the channels and be diverted thereby into the next adjacent channels and advanced step by step longitudinally of the receptacle.

We claim:

1. A continuous mixer comprising a horizontal trough for receiving mixable materials at one end thereof and for discharging the mixture from the opposite end thereof, a series of elongated channels spaced longitudinally of the trough along one wall thereof and respectively disposed in planes extending transversely of the trough, means for moving said materials transversely of the trough, into and through said channels respectively, and a longitudinally inclined surface at one side of the material receiving end of each channel for diverting a portion of the transversely moving material from each channel longitudinally of the trough into the next adjacent channel lying nearer the discharge end of the trough and advancing the materials step by step through said trough and out said discharge end thereof.

2. A continuous mixer comprising a horizontal trough for receiving mixable materials at one end thereof and for discharging the mixture from the opposite end thereof, a series of elongated channels spaced longitudinally of the trough along one wall thereof and respectively disposed in planes extending transversely of the trough, means for moving said materials transversely of the trough in recurrent cycles, into and through said channels respectively and back into the trough, and a longitudinally inclined surface at one side of the material receiving end of each channel for diverting a portion of the transversely moving material from each channel longitudinally of the trough into the next adjacent channel lying nearer the discharge end of the trough and advancing the materials step by step through said trough and out said discharge end thereof.

3. A continuous mixer comprising a horizontal trough for receiving mixable materials at one end thereof and for discharging the mixture from the opposite end thereof, a series of elongated channels spaced longitudinally of the trough along one wall thereof and respectively disposed in planes extending transversely of the trough, a shaft extending longitudinally in said trough, paddles on said shaft for moving said materials transversely of the trough under said shaft into and through said channels respectively and over the top of said shaft into the trough in recurrent cycles, and a longitudinally inclined surface at one side of the material receiving end of each channel for diverting a portion of the transversely moving material from each channel longitudinally of the trough into the next adjacent channel lying nearer the discharge end of the trough and advancing the materials step by step through said trough and out said discharge end thereof.

4. A continuous mixer comprising a horizontal trough for receiving mixable materials at one end thereof and for discharging the mixture from the opposite end thereof, a series of elongated channels spaced longitudinally of the trough along one wall thereof and respectively disposed in planes extending transversely of the trough, a shaft extending longitudinally in said trough, paddles on said shaft for moving said materials transversely of the trough under said shaft, into and through said channels respectively and over the top of said shaft into the trough in recurrent cycles, each paddle comprising at least one radial blade of wedge-shaped cross-section with one face in a plane parallel to one wall of the channel through which the blade passes and a second face disposed at an angle to said first said face and to the second wall of the channel for trowelling the materials against said second channel wall, and a longitudinally inclined surface at one side of the material receiving end of each channel for diverting a portion of the transversely moving material from each channel longitudinally of the trough into the next adjacent channel lying nearer the discharge end of the trough and advancing the materials step by step through said trough and out said discharge end thereof.

5. A continuous mixer comprising a horizontal trough for receiving mixable materials at one end thereof and for discharging the mixture from the opposite end thereof, a series of elongated channels spaced longitudinally of the trough along one wall thereof and respectively disposed in planes extending transversely of the trough, a shaft extending longitudinally in said trough, paddles on said shaft for moving said materials transversely of the trough under said shaft, into and through said channels respectively and over the top of said shaft into the trough in recurrent cycles, each paddle comprising at least one radial blade of wedge-shaped cross-section with one face in a plane parallel to one wall of the channel through which the blade passes and a second face disposed at an angle to said first said face and to the second wall of the channel for trowelling the materials against said second channel wall, a longitudinally inclined surface at one side of the material receiving end of each channel for diverting a portion of the transversely moving material from each channel longitudinally of the trough into the next adjacent channel lying nearer the discharge end of the trough and advancing the materials step by step through said trough and out said discharge end thereof and a cutting blade on said shaft adjacent said discharge end of said trough for severing protruded portions of the material therefrom as the material is ejected from said discharge end of said trough.

6. A continuous mixer comprising a horizontal trough, a pair of parallel longitudinal channels in the bottom of said trough, a series of vertical elongated channels along each of the opposite side walls of the trough, a rotary shaft above each longitudinal channel, paddles on each shaft and comprising blades spaced apart along each shaft and operable across said longitudinal channels for moving material in the trough correspondingly, and a longitudinally inclined surface at one side of the lower end of each vertical channel for diverting material longitudinally of the trough from each vertical channel to the next adjacent vertical channel for advancing said material longitudinally of the trough step by step from one end thereof to and out of the opposite end thereof.

7. A continuous mixer comprising a horizontal trough, a pair of parallel longitudinal channels in the bottom of said trough, a series of vertical elongated channels along each of the opposite side walls of the trough, a rotary shaft above each longitudinal channel, paddles on each shaft and comprising blades spaced apart along each shaft and operable across said longitudinal channels in opposite directions respectively and into and through said vertical channels at said opposite sides respectively of said trough for moving material in the trough correspondingly in recurrent cycles returning the material to the center of the trough between said shafts, and a longitudinally inclined surface at one side of the lower end of each vertical channel for diverting material longitudinally of the trough from each vertical channel to the next adjacent vertical channel for advancing said material longitudinally of the trough step by step from one end thereof to and out of the opposite end thereof.

8. A continuous mixer comprising a horizontal trough, a longitudinal shaft rotatable in said trough, stationary ploughs in and spaced apart longitudinally of said trough to provide elongated channels therebetween, blades spaced apart along said shaft for operation through said channels, and a longitudinally inclined surface on each plough for diverting material from a course transversely of the trough under impetus of each blade to a course longitudinally of said trough and into the channel for the next adjacent blade.

9. A continuous mixer comprising a horizontal trough, a longitudinal shaft rotatable in said trough, stationary ploughs in and spaced apart longitudinally of said trough and providing elongated channels therebetween, blades spaced apart along said shaft for operation through said channels, a longitudinally inclined surface on one side of each plough for diverting material from a course transversely of the trough under impetus of one blade to a course longitudinally of said trough and into the channel for the next adjacent blade, and a transverse surface on the opposite side of each plough for directing the diverted material through the channel.

10. A continuous mixer comprising a horizontal trough, a longitudinal shaft rotatable in said trough, stationary ploughs in and spaced apart longitudinally of said trough and providing elongated channels therebetween, blades spaced apart along said shaft for operation through said channels, a longitudinally inclined surface on one side of each plough for diverting material from a course transversely of the trough under impetus of one blade to a course longitudinally of said trough and into the channel for the next adjacent blade, and a transverse surface on the opposite side of each plough for directing the diverted material through the channel, each plough having a transverse surface adjacent said longitudinally inclined surface to cooperate with the first said transverse surface on the next adjacent plough to form said channel therebetween.

11. A continuous mixer comprising a horizontal trough, a longitudinal shaft rotatable in said trough, stationary ploughs in and spaced apart longitudinally of said trough and providing elongated channels therebetween, blades spaced apart along said shaft for operation through said channels, a longitudinally inclined surface on one side of each plough for diverting material from a course transversely of the trough under impetus of one blade to a course longitudinally of said trough and into the channel for the next adjacent blade, a transverse surface on the opposite side of each plough for directing the diverted material through the channel, and an upper transversely inclined surface on each plough intermediate said sides thereof to afford relief for the material at the discharge end of the channel.

12. A continuous mixer comprising a horizontal trough, a longitudinal shaft rotatable in said trough, stationary ploughs in and spaced apart longitudinally of said trough along one wall thereof and providing vertical elongated channels therebetween, blades spaced apart along said shaft for operation through said channels, and a longitudinally inclined surface on one side of each plough at the lower end thereof for diverting material from a course transversely of the trough under impetus of one blade to a course longitudinally of said trough and into the lower end of the vertical channel for the next adjacent blade.

13. A continuous mixer comprising a horizontal trough, a longitudinal shaft rotatable in said trough, stationary ploughs in and spaced apart longitudinally of said trough along one wall thereof and providing vertical elongated channels therebetween, blades spaced apart along said shaft for operation through said channels, a longitudinally inclined surface on one side of each plough for diverting material from a course transversely of the trough under impetus of one blade to a course longitudinally of said trough and into the channel for the next adjacent blade, and a substantially vertical transverse surface on the opposite side of each plough for directing the diverted material upwardly through the channel.

14. A continuous mixer comprising a horizontal trough, a longitudinal shaft rotatable in said trough, stationary ploughs in and spaced apart longitudinally of said trough along one wall thereof and providing vertical elongated channels therebetween, blades spaced apart along said shaft for operation through said channels, a longitudinally inclined surface on one side of each plough for diverting material from a course transversely of the trough under impetus of each blade to a course longitudinally of said trough and into the channel for the next adjacent blade, a substantially vertical transverse surface on the opposite side of each plough for directing the diverted material upwardly through the channel, and a vertical transverse surface on each plough above said longitudinally inclined surface to cooperate with the first said vertical surface on the next adjacent plough to provide a channel therebetween.

15. A continuous mixer comprising a horizontal trough, a longitudinal shaft rotatable in said trough, stationary ploughs in and spaced apart longitudinally of said trough along one wall thereof and providing vertical elongated channels therebetween, blades spaced apart along said shaft for operation through said channels, a longitudinally inclined surface on one side of each plough for diverting material from a course transversely of the trough under impetus of each blade to a course longitudinally of said trough and into the channel for the next adjacent blade, a vertical transverse surface on the opposite side of each plough, and a longitudinally inclined surface on each blade adjacent said vertical transverse surface on each plough for trowelling said material therebetween as each blade moves through its respective channel.

16. A continuous mixer comprising a mixing receptacle, means forming a series of elongated channels within said receptacle in planes transverse to the longitudinal axis thereof and in spaced relation therealong, a material diverting surface at one side of each channel inclined in a direction longitudinally of said receptacle, paddle means within said receptacle along the length thereof, and means for effecting relative rotation between said channel forming means and said paddle means whereby material within the receptacle and engaged by said paddle means is moved transversely of the receptacle and is engaged by said inclined surfaces, and whereby portions of said material pass through said channels under impetus of said paddle means while other portions are diverted longitudinally of the receptacle from one channel to the next adjacent channel by said inclined surfaces.

WILLIAM D. LE BAR.
RUSSELL E. CUSHING.